United States Patent
Ganachaud

(10) Patent No.: US 7,152,638 B2
(45) Date of Patent: Dec. 26, 2006

(54) SAFETY SYSTEM FOR A LIQUID FUEL TANK

(75) Inventor: Patrick Ganachaud, Laval (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 0 days.

(21) Appl. No.: 10/471,055

(22) PCT Filed: Mar. 4, 2002

(86) PCT No.: PCT/EP02/02358

§ 371 (c)(1), (2), (4) Date: Feb. 17, 2004

(87) PCT Pub. No.: WO02/072377

PCT Pub. Date: Sep. 19, 2002

(65) Prior Publication Data

US 2004/0144443 A1    Jul. 29, 2004

(30) Foreign Application Priority Data

Mar. 7, 2001    (FR) .................................. 01 03192

(51) Int. Cl.
*B65B 1/30* (2006.01)
*B65B 3/28* (2006.01)

(52) U.S. Cl. ...................... 141/198; 141/350; 141/302; 141/303; 141/59

(58) Field of Classification Search ................ 141/198, 141/350, 302, 303, 59; 220/86.2, DIG. 33
See application file for complete search history.

(56) References Cited

U.S. PATENT DOCUMENTS

| | | | |
|---|---|---|---|
| 252,958 A | 1/1882 | McDonnell | |
| 1,363,263 A | 12/1920 | Ohliger et al. | |
| 2,352,898 A | 7/1944 | Hill | |
| 2,396,233 A | 3/1946 | Abrams | |

(Continued)

FOREIGN PATENT DOCUMENTS

EP    0 921 026    6/1999

(Continued)

OTHER PUBLICATIONS

U.S. Appl. No. 10/527,323, filed Mar. 10, 2005, Ganachaud et al.

(Continued)

*Primary Examiner*—Khoa D. Huynh
(74) *Attorney, Agent, or Firm*—Oblon, Spivak, McClelland, Maier & Neustadt, P.C.

(57) ABSTRACT

A fuel tank system includes a fill tube in communication with a tank, and a nozzle guide having surfaces oriented so as to guide a nozzle spout in the nozzle tube during a filling operation of said tank with a fuel. The system also includes a sealing device in the fill tube downstream from the nozzle guide, wherein the sealing device includes at least one lip configured to contact an outer surface of said nozzle spout during said filling operation that seals the fill tube from an outside environment during the filling operation. A vent valve is mounted on the tank, the vent valve being open during the filling operation and during periods of normal use of the tank and being closed at least when the tank is upside down or when the fuel reaches a predetermined level in the tank. The system further includes a pipe arrangement with a first end in communication with the fill tube downstream from the sealing device and a second end in communication with the tank, the second end defining a maximum level for the fuel in the tank during the filling operation.

26 Claims, 3 Drawing Sheets

U.S. PATENT DOCUMENTS

| | | | |
|---|---|---|---|
| 2,845,937 A | 8/1958 | Ksieski | |
| 2,989,062 A | 6/1961 | Gruget | |
| 3,059,661 A | 10/1962 | Benmore | |
| 3,141,469 A | 7/1964 | Stradella | |
| 3,500,843 A | 3/1970 | White | |
| 3,545,465 A | 12/1970 | Zadoo | |
| 3,643,690 A | 2/1972 | Sarai | |
| 3,738,384 A | 6/1973 | Hall | |
| 3,765,435 A | 10/1973 | Schlanzky | |
| 3,907,153 A | 9/1975 | Mutty | |
| 3,910,302 A | 10/1975 | Sudhir | |
| 3,994,358 A | 11/1976 | Smitley | |
| 3,994,360 A | 11/1976 | Leibold | |
| 3,996,951 A | 12/1976 | Parr et al. | |
| 4,000,828 A | 1/1977 | Crute et al. | |
| 4,033,475 A | 7/1977 | Evans | |
| 4,082,169 A | 4/1978 | Bowles | |
| 4,095,609 A | 6/1978 | Martin | |
| 4,185,651 A | 1/1980 | Paulson | |
| 4,351,350 A | 9/1982 | Crute | |
| 4,463,773 A | 8/1984 | Kojima et al. | |
| 4,598,741 A * | 7/1986 | Johnson et al. | 141/350 |
| 4,646,772 A | 3/1987 | Bergsma | |
| 4,659,346 A | 4/1987 | Uranishi et al. | |
| 4,670,749 A | 6/1987 | Armstrong et al. | |
| 4,694,847 A | 9/1987 | Szlaga | |
| 4,700,864 A | 10/1987 | Galles et al. | |
| 4,706,708 A | 11/1987 | Fornuto et al. | |
| 4,714,172 A * | 12/1987 | Morris | 220/86.2 |
| 4,724,861 A | 2/1988 | Covert et al. | |
| 4,760,858 A | 8/1988 | Szlaga | |
| 4,762,156 A | 8/1988 | Rich | |
| 4,770,677 A | 9/1988 | Harris | |
| 4,779,637 A | 10/1988 | Ubaldi | |
| 4,790,349 A | 12/1988 | Harris | |
| 4,809,863 A | 3/1989 | Woodcock et al. | |
| 4,813,453 A | 3/1989 | Jenkins et al. | |
| 4,815,436 A | 3/1989 | Sasaki et al. | |
| 4,816,045 A | 3/1989 | Szlaga et al. | |
| 4,821,908 A | 4/1989 | Yost | |
| 4,836,835 A | 6/1989 | Harris et al. | |
| 4,869,283 A | 9/1989 | Oeffling et al. | |
| 4,872,439 A | 10/1989 | Sonoda et al. | |
| 4,874,020 A | 10/1989 | Bucci | |
| 4,917,157 A | 4/1990 | Gifford et al. | |
| 4,944,779 A | 7/1990 | Szlaga et al. | |
| 4,955,950 A | 9/1990 | Seiichi et al. | |
| 4,966,299 A | 10/1990 | Teets et al. | |
| 4,974,645 A | 12/1990 | Johnson | |
| 4,991,615 A | 2/1991 | Szlaga et al. | |
| 5,014,742 A | 5/1991 | Covert et al. | |
| 5,028,244 A | 7/1991 | Szlaga | |
| 5,029,722 A * | 7/1991 | Bollinger et al. | 220/86.2 |
| 5,054,508 A | 10/1991 | Benjey | |
| 5,054,520 A | 10/1991 | Sherwood et al. | |
| 5,065,782 A | 11/1991 | Szlaga | |
| 5,099,880 A | 3/1992 | Szlaga et al. | |
| 5,156,178 A | 10/1992 | Harris | |
| 5,183,087 A * | 2/1993 | Aubel et al. | 141/59 |
| 5,277,168 A | 1/1994 | Kondo et al. | |
| 5,282,497 A | 2/1994 | Allison | |
| 5,318,069 A | 6/1994 | Harris | |
| 5,392,804 A | 2/1995 | Kondo et al. | |
| 5,404,906 A | 4/1995 | Aoshima et al. | |
| 5,449,029 A | 9/1995 | Harris | |
| 5,474,048 A | 12/1995 | Yamazaki et al. | |
| 5,518,018 A | 5/1996 | Roetker | |
| 5,524,662 A | 6/1996 | Villemure et al. | |
| 5,570,672 A * | 11/1996 | Kunimitsu et al. | 141/59 |
| 5,687,778 A | 11/1997 | Harris | |
| 5,950,655 A | 9/1999 | Benjey | |
| 6,488,015 B1 * | 12/2002 | Isobe | 123/520 |
| 2004/0144443 A1 | 7/2004 | Ganachaud | |

FOREIGN PATENT DOCUMENTS

GB  2 254 846  10/1992

OTHER PUBLICATIONS

U.S. Appl. No. 10/527,321, filed Mar. 10, 2005, Ganachaud et al.
U.S. Appl. No. 11/438,430, filed May 23, 2006, Ganachaud et al.
U.S. Appl. No. 10/577,925, filed May 1, 2006, Ganachaud.

* cited by examiner

SAFETY SYSTEM FOR A LIQUID FUEL TANK

BACKGROUND OF THE INVENTION

1. Field of the Invention

The present invention relates to a safety system for a liquid fuel tank.

2. Discussion of Background

Many safety systems relating to fuel tanks have been described and pertain in general to solving the problems associated with degassing of the tank, while it is being filled, and venting it during normal periods when the engine is at rest and when it is in operation and consuming this fuel. Added to these problems is the increasingly urgent need, as regards protecting the environment, to recover the vapours released during the abovementioned operations, by as far as possible preventing any leakage into the atmosphere.

U.S. Pat. No. 5,183,087 teaches how to degas a fuel tank provided with a fill tube, with a degassing and venting valve connected to a canister and with a small-diameter pipe connecting the upper part of the tank to a guide located at the inlet of the fill tube, the function of which is to initiate the closure of the fuel supply via the nozzle. This guide is provided with a sealing device and the pipe terminates downstream of the sealing device. In this system, degassing takes place exclusively via the valve connected to the canister. This valve is normally closed in the rest position and opens only under the effect of a certain pressure in the tank.

However, the known systems have a number of drawbacks:
difficult control of the overpressure in the tank bringing about inopportune spillages and splashing when filling;
system ill-suited to recovering the vapours via the nozzle;
impossibility of closing off the fuel supply via the nozzle for an overfilling of less than 0.2 l.

SUMMARY OF THE INVENTION

The object of the invention is to remedy the drawbacks of the known systems and to provide a system that allows:
filling without pressure in the tank;
elimination of fuel spillages and splashing;
standardization in the height of the fill tube for the various fuels and methods of recovering the vapours;
the reduction in size of the system;
elimination of the anti-backflow and overfilling prevention valves;
suppression of the vapour blast generated when venting, by elimination of the dense ball valve systems; and
a low cost to be maintained, of the order of magnitude or less than that of the conventional systems existing at the present time.

For this purpose, the invention relates to a safety system for a liquid fuel tank, comprising:
a) a fill tube mounted on this tank and provided, at its inlet orifice, with a nozzle guide provided with a device for sealing with respect to the external environment;
b) a float valve, mounted on the tank, capable of ensuring degassing during an operation of filling this tank withfuel, and likewise venting it during periods of normal use of the tank;
c) a breather pipe for the vapours and for fixing the maximum level of liquid in the tank during filling, which pipe is immersed in the top part of the tank, connecting this top part to the upper part of the fill tube, downstream of the sealing device, on the tank side;

in which the valve is normally open while the tank is being filled and also during periods of normal use of the tank and in which the "waterline" of the float is adjusted so that the valve is closed only under two circumstances, namely when the tank is inclined beyond a predetermined limit, or even completely upside down, and during a transient movement of the fuel, the magnitude of which exceeds a predetermined value.

The invention relates to a safety system for a fuel tank, i.e. a system that allows the fuel to be stored and handled in a manner that is safe both for the user and for the environment. Such a system protects the user from any-hazardous situation, in particular any risk of explosion, implosion, combustion or pollution, while not exposing the external environment to any leakage of liquid or emanation of undesirable gases.

The tank to which the system according to the invention relates consists of a closed vessel, of various shapes, generally sealed with respect to the outside and may be equipped with various internal accessories or accessories that pass through the wall of the vessel. The tank may contain any type of liquid fuel. In particular, it may contain fuel for supplying motor-vehicle internal combustion engines, particularly petrol and diesel. By extension, it may also contain any organic liquid that would be used as fuel and/or oxidizer for the supply of a fuel cell intended to generate an electric current for the purpose of supplying one or more engines consuming this type of energy.

The system according to the invention may be made of any suitable material used for producing a liquid fuel system. Examples of these materials are the various metals and plastics. A system according to the invention may also comprise more than one particular material.

Preferably, the safety system according to the invention is made of plastic. The term "plastic" is understood to mean any material comprising at least one synthetic resin polymer.

All types of plastic may be suitable. Particularly suitable plastics belong to the category of thermoplastics.

The term "thermoplastic" denotes any thermoplastic polymer, including thermoplastic elastomers, and also blends thereof The term "polymer" is understood to mean both homopolymers and copolymers (especially binary or ternary copolymers). Non-limiting examples of such copolymers are: random copolymers, linear block copolymers, other block copolymers and graft copolymers.

Any type of thermoplastic polymer or copolymer whose melting point is below the decomposition temperature is suitable. Synthetic thermoplastics having a melting range spread over at least 10 degrees Celsius are particularly suitable. Examples of such materials are those exhibiting polydispersity of their molecular mass.

In particular, polyolefins, polyvinyl halides, thermoplastic polyesters, polyketones, polyamides and copolymers thereof may be used. A polymer or copolymer blend may also be used, as may a blend of polymeric materials with inorganic, organic and/or natural fillers such as, for example but not restrictively: carbon, salts and other inorganic derivatives, and natural or polymeric fibres. It is also possible to use multilayer structures formed from stacked layers bonded together that comprise at least one of the abovementioned polymers or copolymers.

Polyvinyl halides and polyolefins are generally preferred.

One polymer often employed is polyethylene. Excellent results have been obtained with high-density polyethylene (HDPE).

The fill tube of the system according to the invention has the function of allowing the tank to be filled, without liquid leakage, from a point that is not in the immediate proximity of the tank. For example, it is common, in the case of private motor vehicles, for the fuel tank to be located at a somewhat inaccessible point and connected via a fill tube to an orifice that can be closed off by a cap located at a point easily accessible from the vehicle's body.

According to the invention, the fill tube is provided, at its inlet orifice, with a nozzle guide provided with a device for sealing with respect to the external environment.

The nozzle is that fitted to the pumps of service stations intended for supplying fuel, especially to motor vehicles.

According to the invention, the guide is provided with a device for sealing with respect to the external environment. This sealing device is capable of isolating the internal atmosphere of the tank and that of the fill tube from the ambient atmosphere, even when the nozzle is inserted into the tube and passes along the said guide. The term "isolate" is understood here to denote acceptance of a slight leak of around 12 l/hour at an overpressure of 40 mbar with respect to atmospheric pressure when the nozzle is inserted into the guide and, in any case, less than 20 l/hour under the same pressure.

The operation of filling a tank with a liquid fuel is necessarily accompanied by an increase in the internal pressure in the tank. When the latter includes a degassing circuit, the slight overpressure caused by the liquid newly introduced into the tank tends to be cancelled out thanks to a similar volume of gas that occupied the tank escaping therefrom. In the case of volatile liquids, the gas that escapes will be a more or less homogeneous mixture of the gas present in the tank before filling and vapours coming from the partial vaporization of the liquid introduced.

Moreover, during normal use of the tank, the volume of liquid fuel decreases as fuel is more or less regularly and/or continuously removed. It is therefore necessary to provide and equip tanks with devices allowing air to enter so as to compensate for the loss of liquid during operation and thus prevent depressurization of the tank and the dangers inherent in this situation.

To obviate such risks, the role of the safety valve mounted on a tank is to ensure that the tank is vented, in other words to allow it to be opened in a programmed manner so as to carry out the two separate functions of degassing, when the tank is being filled, and of ventilation of the latter during normal use during which the fuel that it contains is being consumed, or left in the tank for a certain storage period.

The safety system for a liquid fuel tank according to the invention comprises a float valve, that is to say a device that can move by sliding in a cylinder, which follows the level of fuel present in the tanks as soon as this level reaches the bottom rest position of the float in the cylinder. Such a valve is a device that, in collaboration with the other elements of the safety system, contributes to keeping the tank on which it is mounted in a safe state for the user, that is to say a state in which the latter is protected from any hazardous situation, in particular any risk of explosion, implosion, combustion or pollution, while keeping the external environment protected from any leakage of liquid or emanation of undesirable gases.

The system according to the invention also includes a breather pipe for the vapours and for fixing the maximum level of liquid fuel in the tank during filling. This pipe passes through the upper wall of the tank and is immersed inside the latter, in its top part, down to a certain level that corresponds to the maximum permitted upper level of fuel in the full tank.

The breather pipe may pass through the upper wall of the tank at any point on the upper surface of the tank. In particular, it may advantageously pass through this wall at a point close or adjacent to the valve.

The breather pipe connects the top part of the tank to the upper part of the fill tube and is capable of removing most of the volume of gases present in the tank, that is to say it has a diameter sufficient to allow the gases to escape without creating a substantial overpressure inside the tank.

This breather pipe terminates downstream of the sealing device of the nozzle guide present in the top of the fill tube. The term "downstream" should be understood here to mean that side of the sealing device located towards the tank.

According to the invention, the valve is open, in the normal situation, during the operation of filling the tank, just like during the periods of normal use of the latter, when it is closed and the fuel is either being consumed or left in the tank for a certain storage period.

The "waterline" of the float of the valve is regulated so that the valve is closed only under two circumstances. The first of these occurs when the tank is inclined beyond a predetermined limit, or indeed is completely upside down. The second occurs during a transient movement of the fuel, the magnitude of which exceeds a certain predetermined value.

An example of a float valve that is very suitable for the system according to the invention is one that has two chambers, one including a float and the other a volume acting as a container capable of trapping the liquid fuel entrained by the vapours escaping from the valve. Such a valve is disclosed in French Patent Application No. 2000.09286.

The safety system described above is suitable for the various types of geographical situation and the various types of nozzles encountered in service stations that deliver fuel.

For example, it is well suited to the practice in North America whereby the fuel vapours are recovered in a large canister filled with a material that absorbs hydrocarbons.

It is also particularly well suited to the removal and recovery of fuel vapours using what are called "active" nozzles, that is to say nozzles which themselves suck up the vapours, in order to store them and/or recover them from vehicles that have the safety system. These vehicles may be found mainly in Europe.

The sealing device conforming to the safety system according to the invention may be made of any material capable of ensuring that there is good sealing between the tank and the external atmosphere, including when the spout of a fuel nozzle passes along it. The term "sealing" is understood here to mean accepting a slight leakage, of the same order of magnitude as that described above in the situation in which the nozzle is inserted into the guide.

One particular embodiment that has given good results is that in which this device is made of a flexible elastomer material having two elements, the first, on the upstream side, consisting of several circular lips that bend back onto the outer surface of the pipe of the nozzle spout and the second, on the downstream side, consisting of an obturator that can open under the effect of the pressure when the end of the nozzle spout comes into contact with it. A device with two circular lips has given good results.

One possible embodiment of the obturator is a flat circular piece made of elastomer material, slit in the manner of a star from its centre into a certain number of radii that define lamellae of circular sector shape that nevertheless seal against the gases when the said lamellae are in the closed rest position, one against the other. An obturator with four lamellae in quarters has given excellent results. The term "sealing" here has the same meaning as previously.

When the tank is intended for storing fuels of high volatility, a first variant of the system according to the invention, very suitable for nozzles that are provided with fuel vapour suction devices, one outlet of the valve is connected, on the one hand, to a canister filled with a material that absorbs the fuel vapours and a vapour degassing pipe connects, on the other hand, a second outlet of the valve to the upper part of the fill tube, upstream of the sealing device of the guide at a point close to the suction device of the nozzle. This degassing pipe is capable of removing most of the volume of gases that escape from the tank during an operation of filling the latter. Such a type of vapour suction nozzle is also called an "active" nozzle. This system is particularly advantageous when the active nozzle is of the type provided with a suction device having a sleeve capable of surrounding the upper orifice of the tube via which the filling takes place. This type of nozzle may be encountered more often in Europe than in North America.

The term "fuel of high volatility" is understood to mean light fuels such as petrols of various grades, to the exclusion of heavier oils such as diesel or other fuel for diesel engines.

The outlets of the valve in question are, on the one hand, the outlet for the gases of the venting circuit during periods of normal operation and, on the other hand, the outlet for the gases of the degassing circuit during filling. The latter outlet may, for example, be located at the outlet for the gases of the container that traps the entrainments of liquid fuel when such a container is installed in the valve used.

The expression "capable of removing most of the gases" has the same meaning as explained above in the case of the breather pipe.

In the case of liquid fuels of high volatility and of nozzles not provided with a fuel vapour suction system, a second variant of the system comprises a valve that is also connected to a canister filled with a material that absorbs the fuel vapours. However, in this particular case, the volume of the canister, the size of the valve and the diameter of the pipe connecting the valve to the canister are dimensioned so that the latter is capable of removing by itself most of the volume of gases that escape from the tank during the filling operation. In this case, in addition to absorbing the gases during venting of the tank in normal use, the canister also absorbs the gases leaving the tank during filling. This situation may be encountered mainly in North America.

A third variant of the system according to the invention, suitable for fuels of low volatility, comprises a valve, the outlet of which runs into a canister filled with a material that absorbs the fuel vapours. In this case, there is generally only a single outlet of the valve. This system may be encountered both in Europe and in North America.

In the case of fuels of low volatility, a fourth variant, an alternative to the third variant, consists in the outlet of the valve running into the atmosphere, without passing via a canister. This variant is more particularly suitable for European systems. The outlet into the atmosphere may be direct, on the valve itself It may also take place via a device that prevents solid particles from being introduced into the tank or by any other suitable device such as a pipe or any removal circuit.

According to a fifth variant of the system according to the invention, in accordance with the third and fourth variants, a vapour degassing pipe connects a second outlet of the valve to the upper part of the fill tube, upstream of the sealing device of the guide, at a point close to a suction device of the nozzle, and is capable of removing most of the volume of gases that escape from the tank during an operation of filling the latter.

The meanings of the terms "sealing" and "upstream" and of the expression "capable of removing most of the volume of gases that escape from the tank" have here again the same meanings as those explained above.

An alternative system in accordance with each of the five variants explained above again consists in that the degassing pipe also serves for introducing fuel into the tank. In this situation, this pipe extends the fill tube. It may penetrate the tank at any point on its upper surface. Preferably, it penetrates the tank via the same opening in the wall of the latter as a pump and/or gauge module.

The breather and/or degassing pipes generally have a shape that introduces a siphon between the tank and the top of the fill tube. As an option, when the need for it arises, for example in the case of designs with little space, the system according to the invention may also comprise breather and/or degassing pipes that do not include a siphon.

The invention also relates to a liquid fuel tank for a vehicle equipped with a system according to any one of the embodiments detailed above.

Finally, the invention also relates to a fill tube cap of a system according to the variants that include a degassing pipe connected to the upper part of the fill tube, upstream of the sealing device, the characteristic of which is to include, at its end inside the tube, a circular projection capable, when this cap is in the closed position, of closing off the lip of the flexible seal furthest upstream and of isolating, in a sealed manner, the degassing pipe from the assembly formed by the fill tube and the first vapour breather pipe. The sealing here is understood to mean both against the vapours and against liquid fuel.

BRIEF DESCRIPTION OF THE DRAWINGS

FIG. 1 shows schematically a safety system for a liquid fuel tank according to a first embodiment of the present invention.

FIG. 2 shows schematically a safety system for a liquid fuel tank according to a second embodiment of the present invention.

FIG. 3 illustrates the cross section of a nozzle whose spout has been inserted into a sealing device of a tube.

FIG. 4 shows a cross section in a tube/guide/cap assembly in the closed position.

DESCRIPTION OF THE PREFERRED EMBODIMENTS

Figure 1:
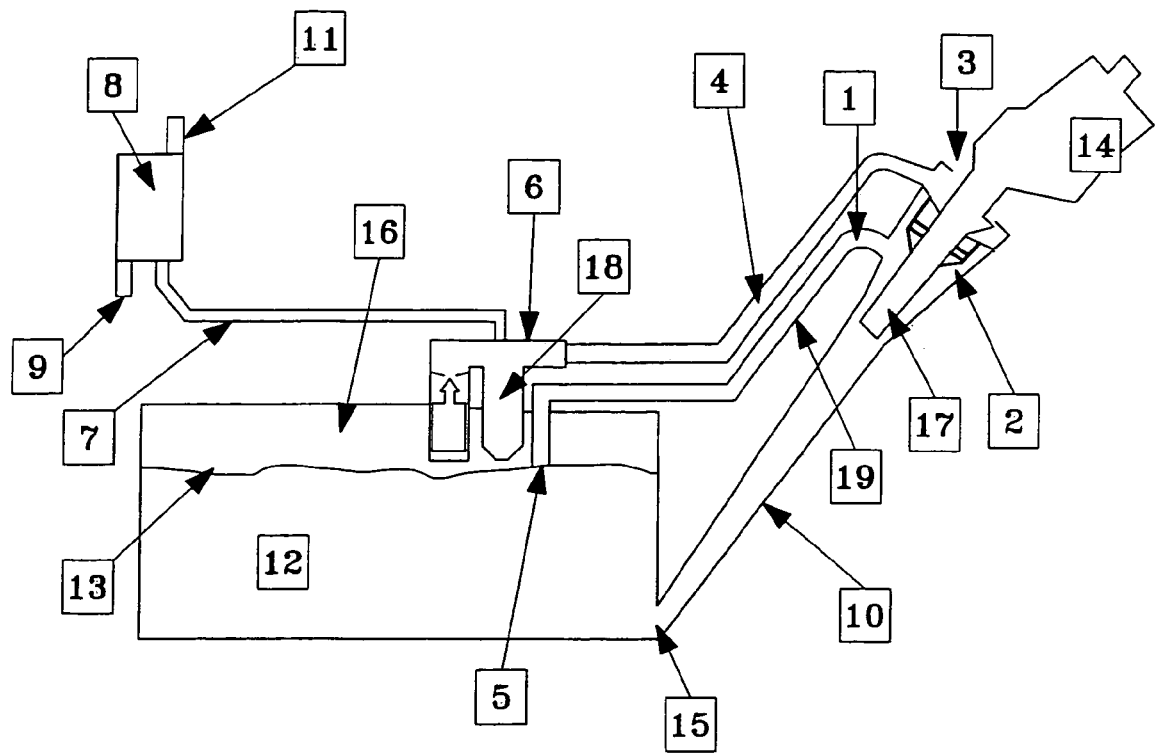
FIGS. 1 to 4 that follow have the purpose of illustrating the invention, without in any way limiting its scope.

FIG. 1 illustrates schematically a safety system for a liquid fuel tank in a version suitable for European countries.

In this figure, a high-density polyethylene tank (12) containing liquid fuel is provided with a fill tube (10), with a degassing and venting valve (6), that includes a liquid trapping container (18), said valve being connected via the pipe (7) to a canister (8) filled with active carbon and via a degassing pipe (4) to the upper orifice (3) of the fill tube (10). A vapour breather pipe (19) connects the overhead of the tank (12) to a region (1) of the tube (10) located immediately downstream of the sealing device (2). This sealing device (2) comprises a flexible seal. The breather pipe (19) penetrates the tank via the same orifice as that made in the wall of the latter for the valve (6) and is immersed in the overhead of the tank (12) down to a level (5) that fixes the maximum permitted liquid fuel level in the tank. FIG. 1 also shows a service station nozzle (14) that delivers fuel, engaged in the top of the tube (10) and passing through the sealing device (2) in such a way that the end (17) of the delivery spout is located downstream of the seal (2).

The details of the operation of the system shown in FIG. 1 are as follows. Starting from the initial situation in which the tank (12) is closed off by a cap (not shown) for closing off the fill tube (10) and the tank in the normal rest situation, with no fuel being removed, the cap closing off the upper orifice or inlet (3) of the fill tube (10) is opened so as to carry out a refuelling operation.

The nozzle (14) is then inserted into the inlet (3) of the tube (10) and mechanically forced so as to penetrate the seals of the sealing device (2) and to open and pass through the obturator located in the downstream part of this device. This nozzle (14) has, at the end of its spout (17) inserted into the tube (10) downstream of the seal of the sealing device (2), an inlet orifice serving as fuel inflow cut-off trip sensor. Thanks to the seals of the sealing device (2), the ambient air can no longer enter the orifice of the trip system of the nozzle (14). The obturator is opened by the spout (17) that forces open the wall cut into the form of a cross, preventing filling when it is in the closed position. This arrangement of the obturator makes it possible to force the nozzle (14) to assume a correct position-so as to deliver the fuel into the tank (12) and to position the spout (17) of the nozzle (14) downstream of the sealing device (2).

Next, the user performs the operation of opening the nozzle (14) placed correctly in the tube (10) and petrol starts to be delivered into the tank (12). In order for the nozzle (14) not to initiate and cause the inflow of petrol to stop, air and/or petrol vapours escape via the breather pipe (19), the part pipe immersed in the tank down to the level (5), the gas pocket (16), the valve (6), the degassing pipe (4) and the atmosphere close to the inlet (3).

At the same time, the volume of petrol introduced via the tube (10) replaces the volume of gas present in the pocket (16) of the tank (12). This volume of gas escapes, as explained above, via the valve (6) and the degassing pipe (4).

At the start of the pipe (7) of the valve (6) there is a Venturi device that introduces a certain head loss into the connection between the valve (6) and the canister (8), so as to let through to the canister only a small amount of gas, substantially less than that flowing in the pipes (19) and (4). This arrangement prevents the active carbon that fills the canister (8) from being unnecessarily saturated during the filling operation.

During filling, the overpressure within the tank (12) relative to atmospheric pressure remains very low and determined only by the low head-loss characteristics of the open passages of the valve (6) and of the degassing pipe (4).

The gases escaping into the atmosphere at the inlet (3) of the nozzle are sucked up by means of an active system comprising a sleeve (not shown) surrounding the top of the nozzle (14) and the inlet (3) and connected to a suction pump of the service station where the gases are collected.

The petrol level (13) in the tank rises and ends up by being flush with the orifice of the breather pipe (19), at the height of the level (5). At this moment, the nozzle (14) no longer receives air or gas coming from the pocket (16) and the inlet orifice of the spout (17) is subjected to a slight vacuum, which consequently activates the automatic vacuum-sensitive device on the nozzle (14) and cuts off the inflow of petrol.

Since the valve (6) remains open, the very slight overpressure present in the tank during filling is balanced with the atmospheric pressure via the degassing pipe (4) and the outlet (3). After the cap for closing off the orifice of the tube (10) has been closed, pressure balancing in the tank is continued by means of the pipe (7) and the canister (8).

Figure 2:
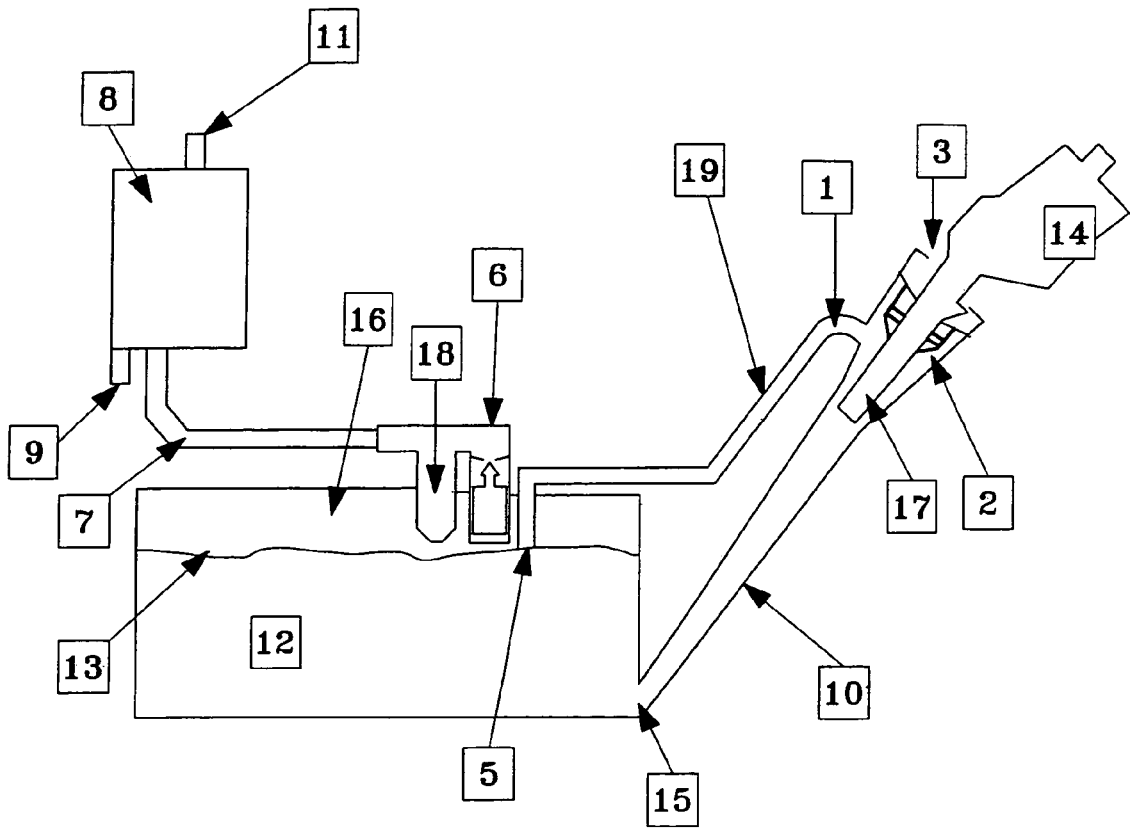

FIG. 2 shows schematically a safety system for a liquid fuel tank in a version suitable for North America.

In this figure, a high-density polyethylene tank (12) containing liquid fuel is provided with a fill tube (10), with a degassing and venting valve (6), that includes a liquid trapping container (18), said valve being connected via the pipe (7) to a large canister (8) filled with active carbon. A vapour breather pipe (19) connects the overhead of the tank (12) to a region (1) of the tube (10) located immediately downstream of the sealing device (2). This sealing device (2) comprises a flexible seal. The breather pipe (19) penetrates the tank via the same orifice as that made in the wall of the latter for the valve (6) and is immersed in the overhead of the tank (12) down to a level (5) that fixes the maximum permitted liquid fuel level in the tank. FIG. 2 also shows a service station nozzle (14) that delivers fuel, engaged in the top of the tube (10) and passing through the sealing device (2) in such a way that the end (17) of the delivery spout is located downstream of the seal (2). This spout (17) is pierced by openings (not shown) that are connected to an external fuel vapour suction device.

The details of the operation of the safety system of FIG. 2 are as follows. Starting from the initial situation in which the tank (12) is closed off by a cap for closing off the fill tube (10) and the tank in the normal rest situation, with no fuel being removed, the cap closing off the inlet (3) of the fill tube (10) is opened so as to carry out a refuelling operation.

The nozzle (14) is then inserted into the inlet (3) of the tube (10) via a nozzle guide and mechanically forced so as to penetrate the seals of the sealing device (2), which can include two circular, concentric lips, and to open and pass through the obturator located in the downstream part of this device. This nozzle (14) has, at the end of its spout (17) inserted into the tube (10) downstream of the seal of the sealing device (2), an inlet orifice serving as fuel inflow cut-off trip sensor. Thanks to the seal of the sealing device (2), the ambient air can no longer enter the orifice of the trip system of the nozzle (14). The obturator is opened by the spout (17) that forces open the wall cut into the form of a cross, preventing filling when it is in the closed position. This arrangement of the obturator makes it possible to force the nozzle (14) to assume a correct position so as to deliver the fuel into the tank (12) and to position the spout (17) of the nozzle (14) downstream of the sealing device (2).

Next, the user performs the operation of opening the nozzle (14) placed correctly in the tube (10) and petrol starts to be delivered into the tank (12). In order for the nozzle (14) not to initiate and cause the inflow of petrol to stop, air and/or petrol vapours escape via the breather pipe (19), the pipe part immersed in the tank down to the level (5), the gas pocket (16), the valve (6), the pipe (7), the canister (8) and the venting outlet (11).

At the same time, the volume of petrol introduced via the tube (10) replaces the volume of gas present in the pocket (16) of the tank (12). This volume of gas escapes, as explained above, via the valve (6) and the canister (8).

During filling, the overpressure within the tank (12) relative to atmospheric pressure remains very low and determined only by the low head-loss characteristics of the open passages of the valve (6), of the pipe (7) and of the canister (8).

The vapours coming from the pocket (16) are removed by the breather pipe (19) from the orifice located at the level (5), the inlet of the region (1) and the suction holes (not illustrated) of the spout (17) of the nozzle (14).

The petrol level (13) in the tank rises and ends up by being flush with the orifice of the breather pipe (19), at the height of the level (5). At this moment, the nozzle (14) no longer receives air or gas coming from the pocket (16) and the inlet orifice of the spout (17) is subjected to a slight vacuum, which consequently activates the automatic vacuum-sensitive device on the nozzle (14) and cuts of the inflow of petrol.

Since the valve (6) remains open, the very slight overpressure present in the tank during filling is balanced with the atmospheric pressure via the pipe (7), the canister (8) and the outlet (11).

Figure 3:
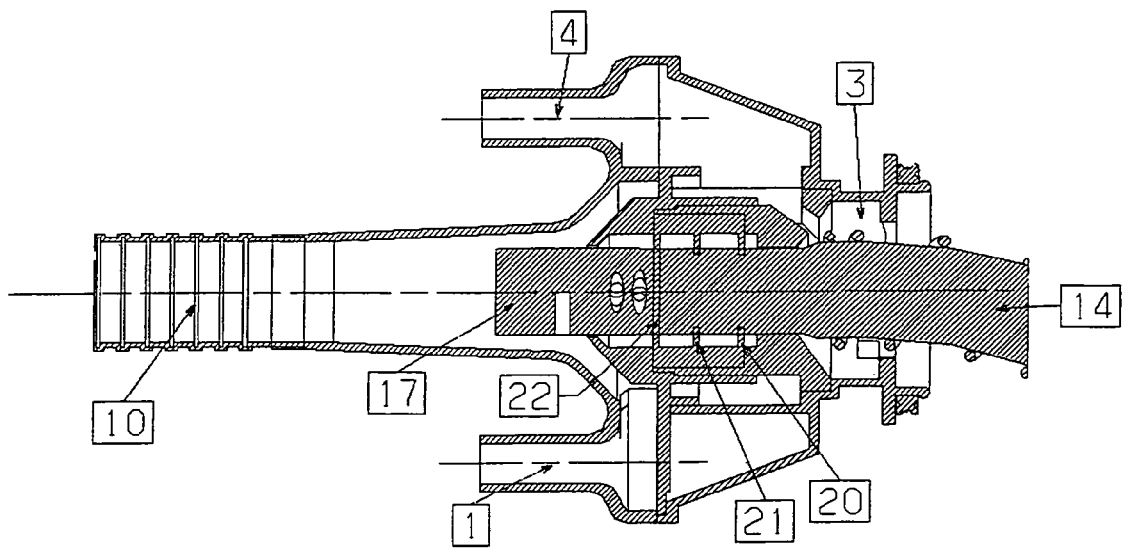

FIG. 3 illustrates the cross section of a nozzle (14) whose spout (17) has been correctly inserted into a sealing device (2) of a tube (10). This device is provided with two flexible seals (20) and (21) and with a star-shaped obturator having four quarters (22). The figure also shows the inlet (1) of the breather pipe (19) and the orifice (3) of the degassing pipe (4).

Figure 4:
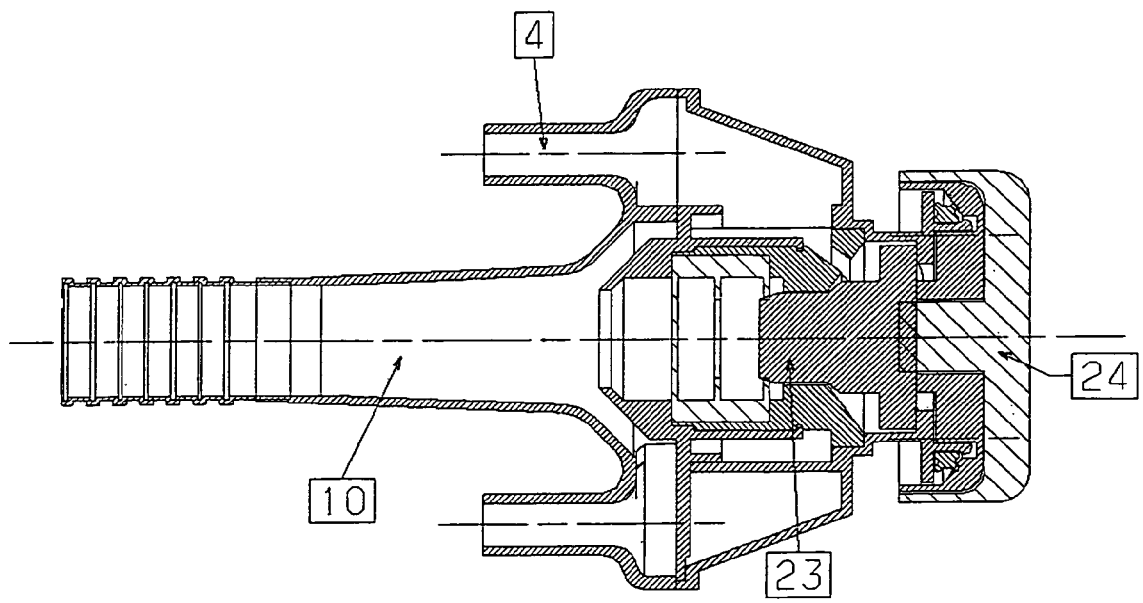

FIG. 4 shows a cross section in a tube/guide/cap assembly in the closed position. It shows the projecting end (23) of the cap (24) that closes off the connection between the fill tube (10) and the degassing pipe (4).

The invention claimed is:

1. A fuel tank system comprising:
   a fill tube in communication with a tank;
   a nozzle guide having surfaces configured to guide a nozzle spout in said fill tube during a filling operation of said tank;
   a sealing device located in said fill tube and between said tank and said nozzle guide, wherein said sealing device comprises at least one lip configured to contact an outer surface of said nozzle spout during said filling operation so as to seal said fill tube from an outside environment during said filling operation;
   a vent valve mounted on said tank, said vent valve being open during said filling operation and during periods of normal use of said tank and being closed at least when said tank is upside down or when said fuel reaches a predetermined level in said tank; and
   a pipe with a first end in communication with said fill tube at a location between said tank and said sealing device and a second end in communication with said tank, wherein said second end defines a maximum level for said fuel in said tank during said filling operation,
   wherein said pipe is configured to allow gases to escape from said tank without creating a substantial over pressure inside said tank so that said filling operation takes place without pressure in said tank, and said vent valve is open during said filling operation without pressure in said tank.

2. The system according to claim 1, wherein said at least one lip is flexible.

3. The system according to claim 2, wherein said at least one lip is made of a flexible elastomer material.

4. The system according to claim 1, wherein said at least one lip is circular.

5. The system according to claim 1, wherein said sealing device comprises at least two concentric lips configured to contact said outer surface of said nozzle spout during said filling operation.

6. The system according to claim 5, wherein said at least two lips seal said fill tube from an outside environment during said filling operation.

7. The system according to claim 1, wherein said sealing device further comprises an obturator located between said tank and said at least one lip, wherein said obturator is configured to open under pressure when an end of said nozzle spout comes into contact with said obturator.

8. The system according to claim 1, further comprising a canister in communication with a first outlet of said vent valve.

9. The system according to claim 8, wherein said canister comprises a material that absorbs fuel vapors.

10. The system according to claim 9, further comprising a nozzle with said nozzle spout inserted in said fill tube.

11. The system according to claim 10, further comprising a fuel introduced into said tank during said filling operation.

12. The system according to claim 11, wherein said fuel has a high volatility.

13. The system according to claim 9, wherein a volume of the canister, a size of the vent valve and a diameter of a connecting element between the vent valve and the canister are dimensioned to remove most of a volume of fuel vapors escaping from the tank during said filling operation.

14. The system according to claim 13, further comprising a nozzle with said nozzle spout inserted in said fill tube, and wherein said nozzle is free of any fuel vapor suction device.

15. The system according to claim 9, further comprising a fuel introduced into said tank during said filling operation, and wherein said fuel has a low volatility.

16. A vehicle comprising the system according to claim 1.

17. A fill tube cap for a system according to claim 1, comprising, at an end inside the fill tube, a projecting end configured to close off, when the fill cap is in a closed position, said at least one lip of the sealing device.

18. The system according to claim 1, wherein said vent valve is a float valve.

19. The system according to claim 18, wherein said float valve consists essentially of one sliding device configured to follow a level of fuel in said tank as soon as said level reaches a bottom rest position of said one sliding device.

20. The system according to claim 1, wherein said predetermined level is higher than said maximum level.

21. The system according to claim 1, wherein said vent valve is closed when said tank is inclined beyond a predetermined limit.

22. The system according to claim 1, wherein said vent valve is closed during a transient movement of the fuel, the magnitude of said movement exceeding a predetermined value.

23. The system according to claim 1, wherein said vent valve includes a liquid trapping container.

24. The system according to claim 1, wherein said fill tube is in communication with a lower half portion of said tank.

25. The system according to claim 1, wherein said vent valve consists essentially of one moving device configured to open and close said vent valve.

26. The system according to claim 1, wherein said vent valve consists essentially of one float valve.

* * * * *